United States Patent
Zosi

[11] Patent Number: 6,149,306
[45] Date of Patent: Nov. 21, 2000

[54] SLIDING BEARING

[75] Inventor: Michel Zosi, Rennaz, Switzerland

[73] Assignee: C.R.I.D. S.A. Compagnie de Recherches Industrielle et Developpements, Rennaz, Switzerland

[21] Appl. No.: 09/233,248

[22] Filed: Jan. 19, 1999

[30] Foreign Application Priority Data

Jan. 23, 1998 [CH] Switzerland ............................ 0161/98

[51] Int. Cl.[7] .................................................. F16C 32/06
[52] U.S. Cl. ............................................ 384/12; 384/107
[58] Field of Search ............................... 384/12, 13, 100, 384/107, 114, 121

[56] References Cited

U.S. PATENT DOCUMENTS

| | | | |
|---|---|---|---|
| 3,998,502 | 12/1976 | Walter et al. | 384/107 |
| 4,448,460 | 5/1984 | Yamamoto | 384/12 |
| 4,606,587 | 8/1986 | Thompson | 384/12 |
| 4,630,942 | 12/1986 | Tsumaki et al. | 384/12 X |
| 4,828,403 | 5/1989 | Schwartzman | 384/107 X |
| 5,104,237 | 4/1992 | Slocum | 384/12 |

*Primary Examiner*—Richard M. Lorence
*Attorney, Agent, or Firm*—Pearne & Gordon LLP

[57] ABSTRACT

Air flows are produced in a sliding bearing between the bearing surfaces (L) sliding relative to one another of a movable body (1, 3) and a stationary body (2). Compressed air is expanded through nozzles (4) between the bearing surfaces (L) to atmospheric pressure. As a result of these air flows, the static pressure between the bearing surfaces (L) is reduced so that compressive forces acting between the moving and the stationary body are produced. The bearing surfaces (L) and air flows are so matched to one another that the movable body (1, 3) is in a force-free state of equilibrium on assuming a position in which the bearing surfaces (L) of the movable body (1, 3) are not in contact with the bearing surfaces (L) of the stationary body (2). In order to ensure a clearly defined equilibrium position, the clearance between the movable body (1, 3) and the stationary body (2) is chosen so that any possible change of the spacings between the bearing surfaces brings about an opposing change of the pressure ratios. Spacings of approximately 0.01 to 0.02 mm are suitable for air flows. So that the sliding bearing can absorb external forces, the bearing surfaces are enlarged for increasing the compressive forces. The sliding bearing is virtually free from friction and free from wear. It is suitable for the bearing or seating of machine parts moved in rotary or linear manner, such as for the seating of spindles in machine tools.

17 Claims, 5 Drawing Sheets

SLIDING BEARING

FIELD OF THE INVENTION

This invention relates to a sliding bearing and seating method for a sliding bearing usable for the seating of rotary shafts or spindles or for the seating of bodies subject to translational movement.

BACKGROUND OF THE INVENTION

Machine parts moved rotationally or linearly are mounted so as to be slidable (sliding or plain bearings) or on freely rotating balls or rollers (anti-friction or roller bearings). Sliding bearings are much simpler mechanically than roller bearings, but uses of sliding bearings are limited due to friction or lubrication problems, which are more difficult to solve in sliding bearings due to the size of the bearing surfaces engaging on and moving relative to one another (compared with the much smaller, theoretically punctiform or linear bearing surfaces in roller bearings) and due to the sliding friction which occurs (compared with the much smaller rolling friction in roller bearings). It has therefore long been a desire in engineering construction, either e.g. by the development of better lubricants or improved material pairings, to improve sliding bearing characteristics in such a way that sliding bearings can also be used in applications where hitherto only roller bearings could be used in accordance with the prior art.

SUMMARY OF THE INVENTION

An object of the present invention is therefore to provide a sliding bearing method and a sliding bearing which has improved characteristics compared with known sliding bearings and in particular with regards to friction or lubrication and wear. A sliding bearing according to the invention e.g. is to be able to substantially replace ball bearings in applications for the seating of a tool or workpiece spindle in a machine tool.

The invention is based on the application of fluid dynamic laws to the technology of bearings. In a sliding bearing according to the invention, a fluid flow (advantageously an air flow) is produced between a body moved linearly or rotationally and a stationary body, on which the moving body is to be mounted, so that through this air flow fluid dynamic forces acting on the bearing surfaces are produced. The bearing surfaces of the movable and the stationary body are so designed that the movable body, even under an external load to be absorbed by the sliding bearing, as a result of the fluid dynamic forces acting on its bearing surfaces, is held in an equilibrium position predetermined by the stationary body, from which it is spaced by a slot-like cavity from the stationary body in a contactless and quasi-stable manner.

The fluid flowing between the moving and stationary bodies, apart from its function of producing the forces positioning the moving body, also fulfils the function of a lubricant (in the case of air with extremely low friction), together with the function of a coolant for bearing cooling purposes.

BRIEF DESCRIPTION OF THE DRAWINGS

The principle and embodiments of the inventive sliding bearing are described in greater detail hereinafter with reference to the attached drawings, wherein.

DESCRIPTION OF PREFERRED EMBODIMENTS

Figure 1:
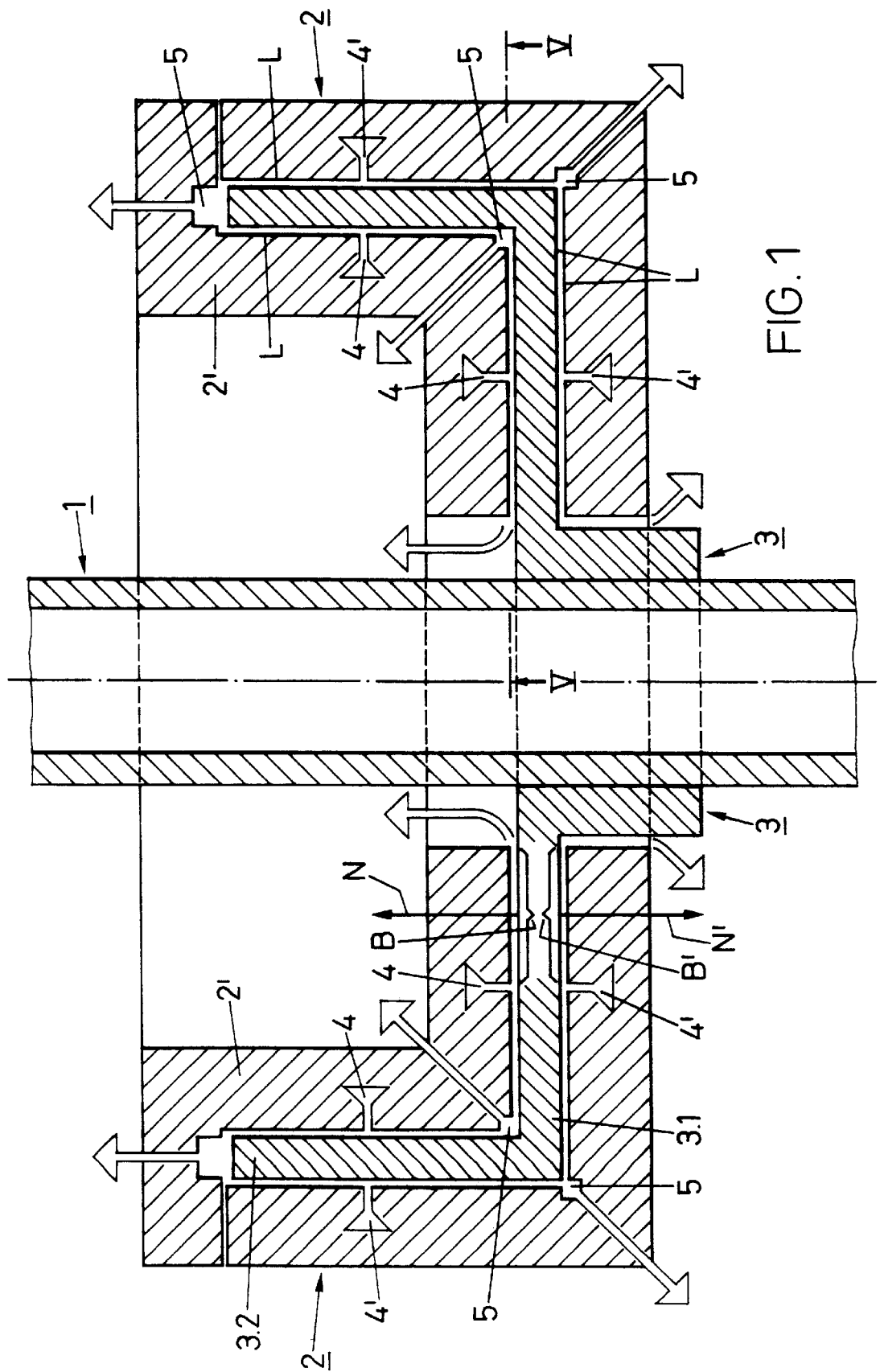
FIG. 1 is a schematic side elevation in axial section through an embodiment of the inventive sliding bearing for a rotor to be mounted in a stator.

FIG. 1 is a schematic axial section through a shaft 1 (rotor or moving body) which is mounted by an embodiment of the inventive sliding bearing in a stator comprising two parts 2 and 2' forming a reception space. For the bearing or seating of shaft 1, a bearing body 3 is rigidly connected to the shaft (e.g., shrunk onto the shaft), so that the bearing body comprises a rotating body arranged coaxially with the shaft. Bearing body 3 is placed in a suitable reception space in stator 2. Bearing surfaces L of the sliding bearing slide relative to each other, separated by a fluid layer, and are positioned in pairs, facing each other on the opposite surfaces of bearing body 3 and on the corresponding (inner) surfaces of stator 2.

Bearing surfaces L are shaped in such a way that substantially any selected bearing surface area of either the rotor (bearing body 3) or the stator 2 has an opposite or facing area on the other part, and so that a normal (perpendicular from the center of the area) of the considered bearing surface area and a normal of the corresponding opposite area is located along the same line and directed in opposition to each other. FIG. 1 shows this symmetry condition, made on the bearing surfaces L of a sliding bearing according to the invention, using the example of area B on bearing body 3 with a normal N and the opposite area B' with a normal N'. This also applies to the arrangement of bores through which bearing air is forced, as is shown here using the example of nozzles 4 and 4'.

As a result of this symmetrical arrangement of the bearing surfaces L, the sum of all the forces acting on the bearing surface area and the opposite area close to the equilibrium position is zero. Thus, the fluid dynamically produced forces on the bearing surface area and on the opposite area compensate for external forces tending to disturb the equilibrium condition.

For axial bearing purposes, bearing body 3 shown in FIG. 1 has a part 3.1 extending radially, i.e. in an annular plate-like shape around the shaft, and for radial bearing purposes a part 3.2 extending axially, i.e. having a hollow cylindrical shape concentrically around shaft 1. The aforementioned symmetry conditions are substantially fulfilled for both parts.

Stator 2 also has bores acting as nozzles 4 for forcing a fluid (e.g. air) in between bearing body 3 and stator 2, and exhaust air ducts 5 for leading away the air introduced between bearing body 3 and stator 2. The nozzles could also be located in the bearing body. It has proved to be advantageous if the arrangement of the nozzles and the exhaust air ducts with respect to one another are also subject to the aforementioned symmetry conditions, i.e., for each nozzle located in a bearing surface area and for each exhaust air duct there is a corresponding nozzle and a corresponding exhaust air duct in the opposite area, as shown in the embodiment according to FIG. 1. When these nozzles and ducts are opposite each other, as shown, the symmetry is beneficial.

During the rotation of shaft 1, nozzles 4 force compressed air between bearing surfaces L of the two bearing body parts 3.1 and 3.2 and stator 2, said air flowing from the nozzles to the exhaust air ducts in the bearing clearance unidirectionally relative to bearing surfaces L and consequently producing the desired fluid dynamic action. As a result of the fluid dynamic action, pressure ratios occur between the bearing surfaces sliding relative to one another, which keep bearing body 3 in a position in which the mutual spacings between stator 2 and bearing body 3 are substantially compensated, i.e., in which the spacing of any selected bearing surface area (e.g., B) of the rotor from the stator is substantially the same as the spacing of the corresponding opposite area (e.g. B') from stator 2, i.e. so that bearing body 3 remains in place relative to a well defined central position.

Thus, in other words, bearing surfaces L of bearing body 3 and bearing surfaces L of stator 2 are not in contact during operation. The only resistance which bearing body 3 has to overcome during rotation, is that of the air flowing between the bearing surfaces L and which, compared with the sliding friction between fixed surfaces or compared with internal friction in liquid lubricating layers, is virtually negligible. The sliding bearing according to the invention is virtually frictionless and can consequently not only be operated in a substantially loss-free manner, but also substantially in a wear-free manner. This means that the material pairing of the bearing surfaces sliding on one another is not relevant. In addition, the characteristics of the inventive sliding bearing are substantially independent of its position and independent of the torque.

Figure 2:
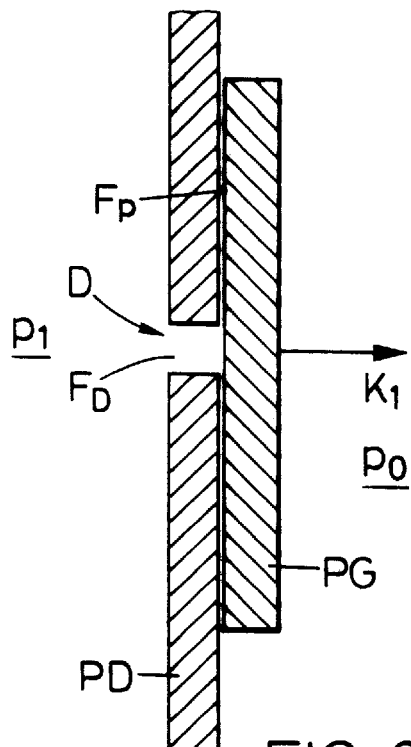
FIGS. 2, 3 and 4 are schematic partial sectional views of portions of a bearing system for illustrating the operating principle of the sliding bearing according to the invention.
Figure 3:
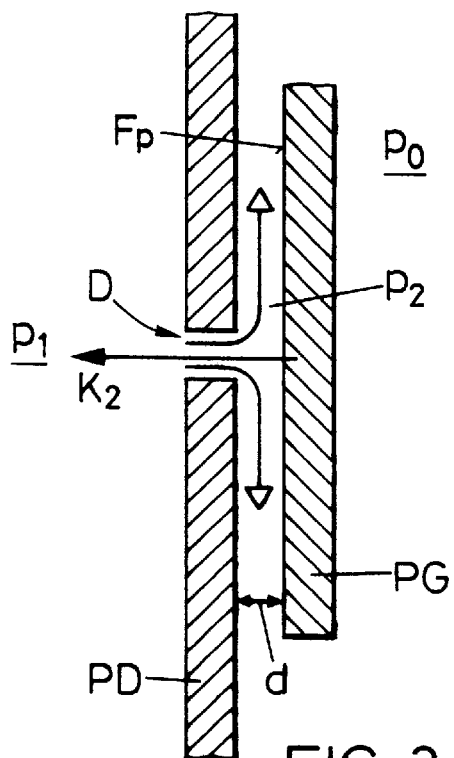
Figure 4:
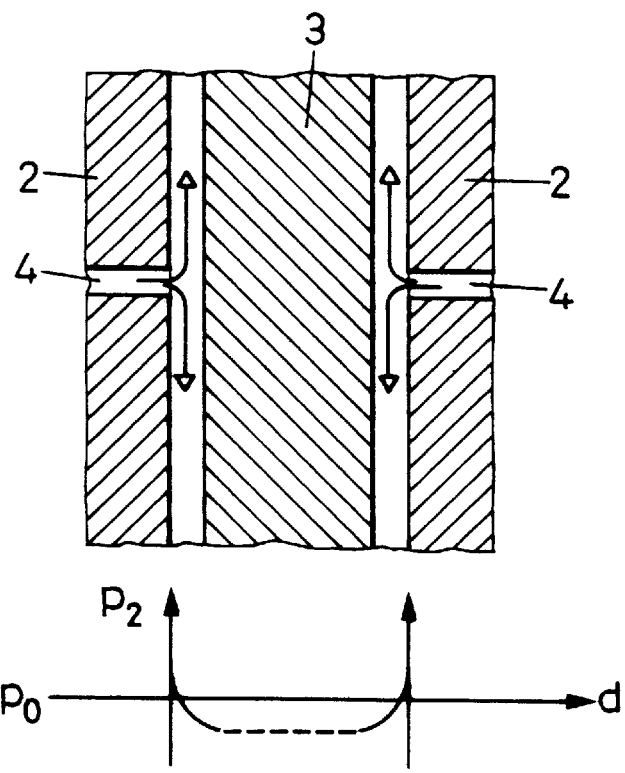

FIGS. 2 to 4 represent a physical explanation of the phenomena of the experimentally found function of the inventive sliding bearing and its parameters and boundary conditions.

FIGS. 2 and 3 show pressure and force ratios in a system in which air under a pressure $P_1$ flows through a nozzle D arranged in a nozzle plate PD and positioned substantially perpendicular to the nozzle plate and is forced into a slot-like space between nozzle plate PD and a counterplate PG and is expanded against the pressure $P_0$ which is lower than $P_1$ (e.g. toward atmospheric pressure).

In FIG. 2, nozzle plate PD and counterplate PG are close together, i.e. the width of the clearance between the two plates PD and PG is very small and close to zero. Thus, despite the pressure difference, little to no air flows through nozzle D. On counterplate PG acts a pressure difference, which attempts to force the counterplate away from the nozzle plate. The force K1 acting on counterplate PG is the pressure difference $P_1-P_0$, multiplied by an area F, which is at least the cross-sectional area FD of the nozzle opening and maximally is the area Fp of the counterplate, as a function of the way the areas rest on one another. FIG. 2 illustrates the static case.

In FIG. 3, nozzle plate PD and counterplate PG are remote from one another (spacing d), so that air passes out of nozzle D and expands in the space between the plates. This leads to a dynamic system, in which the total pressure in the space between nozzle plate PD and counterplate PG comprises a static component acting uniformly in all directions and a kinetic flow component acting in the flow direction.

If the outflowing air quantity and the space conditions between the plates are chosen in such a way that the air passing out of the nozzle can completely expand between the plates (i.e., to atmospheric pressure), the total pressure between the plates is identical with the atmospheric pressure. However, if the static pressure component ($P_2$), reduced by the dynamic pressure component $P_{dyn}$, is below atmospheric pressure, then a force $K_2$ acting against the nozzle plate acts on the counterplate and "draws" the counterplate PG toward the nozzle plate PD. In physics, the phenomenon described is known as the hydrodynamic paradox. Since, in operation, the area facing the nozzle is moved at a high velocity in one direction, other phenomena or effects, which cannot be explained here, also have an effect.

On passing from the static case according to FIG. 2 to the dynamic case according to FIG. 3 by successively increasing the spacing d between the plates, there is consequently a reduction of the static pressure between the plates from $P_1$ to $P_2$ and is reversed into a compressive force acting on counterplate PG ($K_1$ away from the nozzle plate and $K_2$ towards the nozzle plate). The minimum static pressure (maximum force $K_2$) is reached at a small, but still measurable clearance width and is subject to no further change during a further widening within the critical quantity or the experimented, minimum to maximum clearance width or the plate spacing d.

Tests have shown that in the case of the sliding bearing according to the invention with a spacing or sliding bearing clearance of less than 5 $\mu$m, probably as a result of throttling effects, a pressure arises which brings about a repulsion between the plates. For a spacing above 5 $\mu$m, the aforementioned action reversal occurs. The experimented, optimum power range occurs with a clearance width of approximately 10 $\mu$m.

In hypothetical transfer, FIG. 4 shows the application to a bearing body 3 moved between two bearing surfaces of a stator 2, as is shown in FIG. 1. In stator 2, there are two (on a common line) facing bores or nozzles 4, from which air is forced into the slot-like cavities between bearing body 3 and stator 2. Below the detail of the bearing body and stator is plotted a graph, which shows the assumed static pressure distribution between bearing body and stator as a function of the spacing between two bearing surfaces sliding on one another.

FIG. 4 makes it clear that bearing body 3 (in the absence of external forces) assumes a clearly defined, force-free position between the stator bearing surfaces if the clearance between bearing body 3 and stator 2 is small enough for the two distances between the bearing body and the stator (which two distances together are the clearance) to be in the range in which static pressure is still dependent on the spacing. However, it can be seen that with a clearance equal to the two spacings in a range in which the static pressure is no longer dependent on the spacing (thinner bearing body than that shown in FIG. 5), numerous force-free positions are possible, i.e. also positions in which the bearing surfaces of the bearing body and stator are temporarily no longer parallel to one another (e.g. due to radial displacements caused by machining forces on the tool). A minimum clearance width (smaller than 5 $\mu$m) remains as a result of the pressure build-up due to throttling forces and acts as an opposing force during work-caused displacements from the equilibrium position.

Tests with a sliding bearing according to the invention as shown in FIG. 1 have shown that, when using air as the flowing fluid, a clearance between bearing body 3 and stator 2 of 0.02 to 0.04 mm (2×0.01 to 0.02 mm) gives an optimum operation. Tests were carried out with a clearance from 10

μm (2×0.005 mm) to 0.5 mm (2×0.25 mm). It can be concluded from the test result that the static pressure $P_2$ in the case of clearance widths up to approximately 0.01 to 0.02 mm is dependent on said clearance width.

It can be assumed that the effect of the dependence of the static pressure and consequently the dependence of the forces acting on the bearing surfaces on the size of the spacing between the bearing surfaces and the logical utilization of this effect makes possible the inventive sliding bearing method. As a result of this effect, a self-centering system is obtained, in which a restoring force acts on bearing body 3 as soon as it is moved from its equilibrium position. A similar system, in which an over-pressure (air cushion) is produced between the bearing surfaces, whose pressure ratios are not dependent on the clearance width due to the higher static state, does not have a self-centering action and can consequently not function in the manner shown by the invention.

Figure 5:
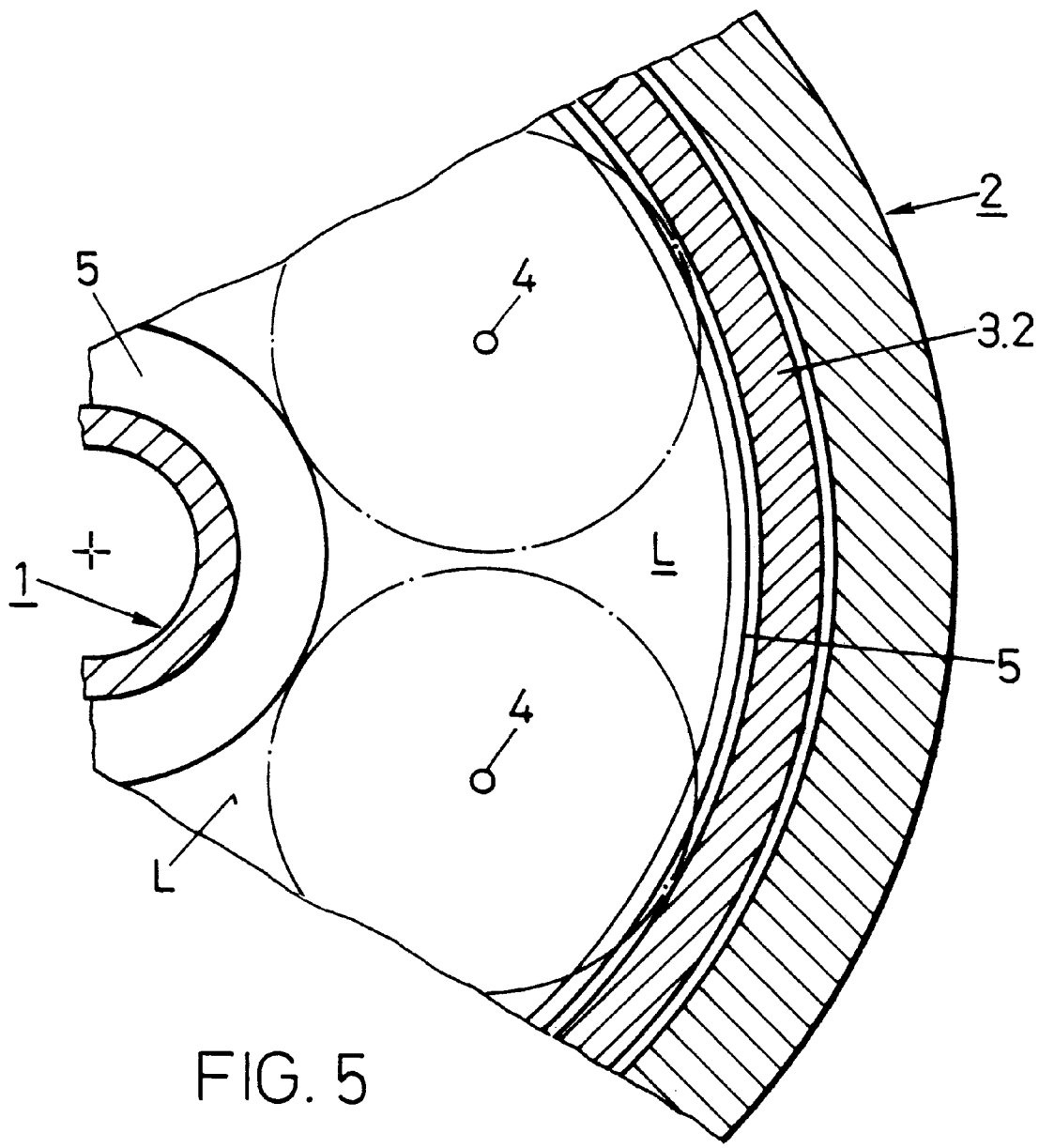
FIG. 5 is a sectional view transverse to the axis of the bearing body of the embodiment of FIG. 1 along line V—V.

FIG. 5 shows a detail from a section transversely to the axis through the sliding bearing along line V—V of FIG. 1. FIG. 5 is in particular an axial plan view of the upper bearing surface L of the stator, on which slides the upper bearing surface of the plate-shaped bearing body part 3.1. It is possible to see two nozzles 4 and two exhaust air ducts 5. The fluid dynamic action of the air flowing out of the nozzles can be fundamentally assumed as rotationally symmetric and constantly decreases with increasing spacing from the nozzle as a result of the internal friction losses in the air.

If the effects of the individual nozzles are to be fully utilized, they must be so positioned that their action surface (circular surface, on which the fluid dynamic action is not negligible, indicated in FIG. 5 with a dot-dash circle around the nozzles 4) does not or does not significantly overlap. Tests have shown that with a clearance between the bearing body and stator of 2×0.01 to 0.02 mm, in the case of a working pressure between approximately 1.5 and 5 atm (1.5 to $5.10^5$ Pa) and for a nozzle opening diameter of approx. 0.5 mm with a spacing between adjacent nozzles (up to 100 mm) in the test setup of approximately 80 mm, good actions can be achieved. This empirical value can be interpreted as the diameter of a circle in which the fluid dynamic action in a non-negligible manner contributes to the function of the bearing. This also means that for an optimum, complete utilization of the existing areas of a bearing body 3, the exhaust air ducts 5 (here grooves) are to be no further than about 40 mm from the nozzles.

Strictly speaking, the symmetry conditions for FIG. 1 do not apply to all the bearing surfaces, but only to those bearing surface areas over which fluid flows are produced, over which consequently a fluid dynamic action circle extends and only if the fluid dynamic action is the same in all these circles. In more general terms, the bearing surfaces of the moving body and the fluid flows are to be matched to one another in such a way that the flow-exposed, moving body in its central position centered in the stator is substantially force-free, i.e., in equilibrium.

In connection with the above considerations, a state of the considered bearing without external (e.g., radial) force action is assumed. In order that the inventive bearing can also absorb external forces, such as, e.g., the weight of the rotor or active forces acting on the shaft, the fluid dynamically active, i.e. air-overflowed bearing surfaces of bearing body 3, and consequently also the reception space of the stator 2, are to be made sufficiently large that the disturbance forces only represent a small percentage of the fluid-dynamically-produced forces. In other words, for a highly loaded bearing more "bearing surface" is made available, i.e., a larger bearing body/stator pair. It has been found that with the aforementioned dimensions it is possible to absorb radial forces up to 25 kp (250 Newton). Compared with standard, radial deflection forces on a cutter spindle of 0.25 to 2.5 Newton, it can be seen that the inventive system is extremely robust with respect to disturbance forces.

For working conditions with small, external disturbance forces, it is possible to use systems with much smaller area bearing bodies with corresponding spacings of the nozzles and exhaust air ducts.

Figure 6:
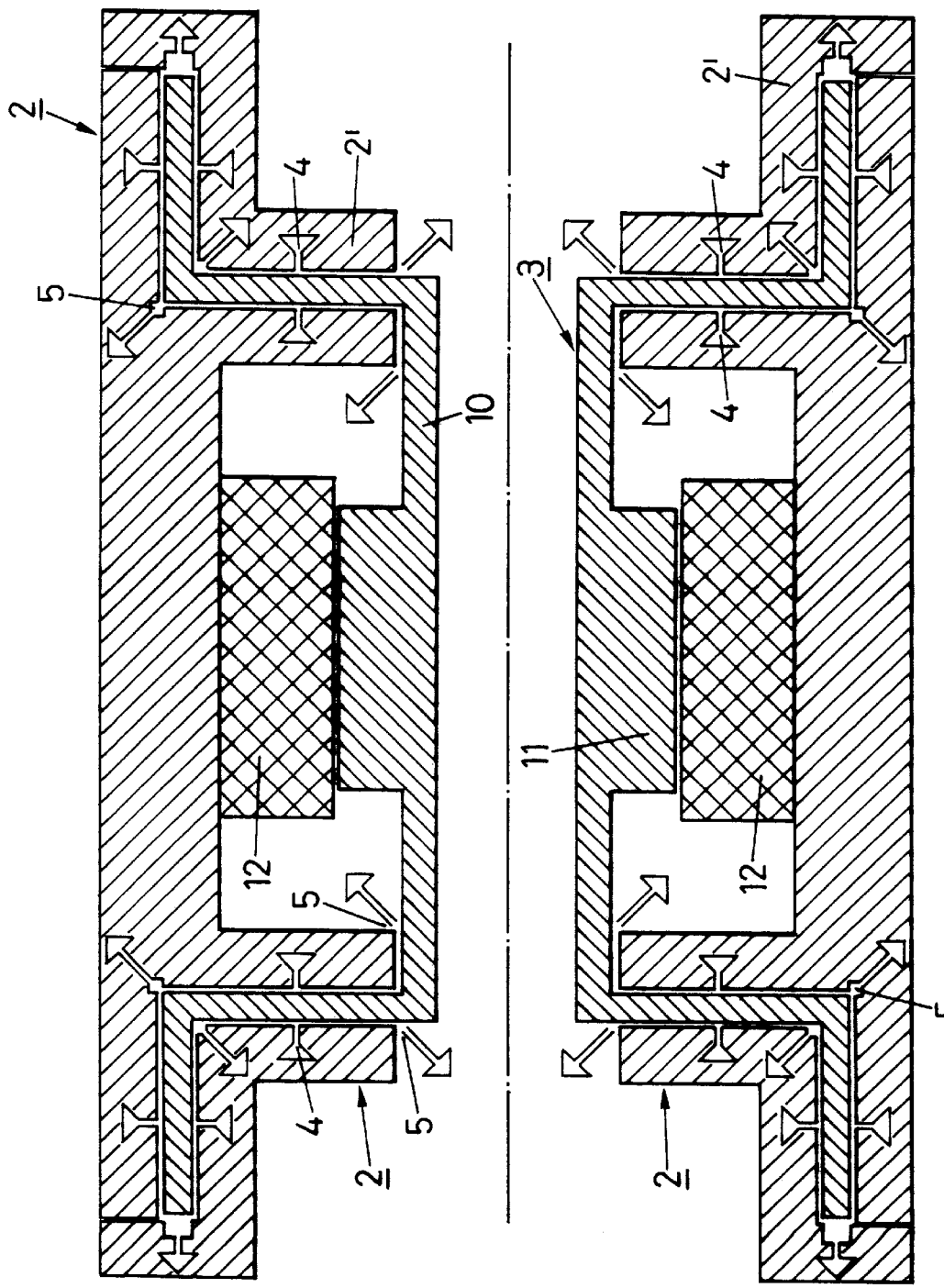
FIG. 6 is a side elevation, in section, of a sliding bearing similar to FIG. 1 as applied to a machine tool spindle.

FIG. 6 diagrammatically shows the essential parts of a spindle drive with two sliding bearings according to the invention corresponding to those of FIG. 1. It is possible to see parts of an electrically driven rotor 10 with a magnet core 11 and bearing bodies 3 placed on the ends. It is also possible to see a stator 2 receiving bearing bodies 3 with a coil 12 supplementing the driving electric motor and a support for nozzles 4 and discharge lines 5 for the expanded air. As stated, the magnet core 11 and coil 12 together form an electric drive for driving the rotor 10. Axially and radially, the clearance between rotor and stator is 2×0.015 mm and the nozzles 4 have an opening diameter of approximately 0.5 mm. Through those nozzles, air is expanded from an operating pressure of e.g. 4 atm ($4 \times 10^5$ Pa) to virtually atmospheric pressure. The spindle is operated at 30,000 to 40,000 r.p.m. Under the given conditions, and also under the action of radially acting disturbance forces of up to 25 kp (250 N), the spindle shown operates in a disturbance-free manner. Normal radial forces acting on the tool spindles are approximately 0.5 kp (5 N). It is once again possible to see the symmetrical arrangement, particularly the facing nozzles acting in opposition on the bearing bodies and the exhaust air ducts equidistantly spaced from the nozzles.

The air consumption of the sliding bearing according to the invention is relatively small. The air used should be free from solid particles, but does not require a special preparation.

Figure 8:
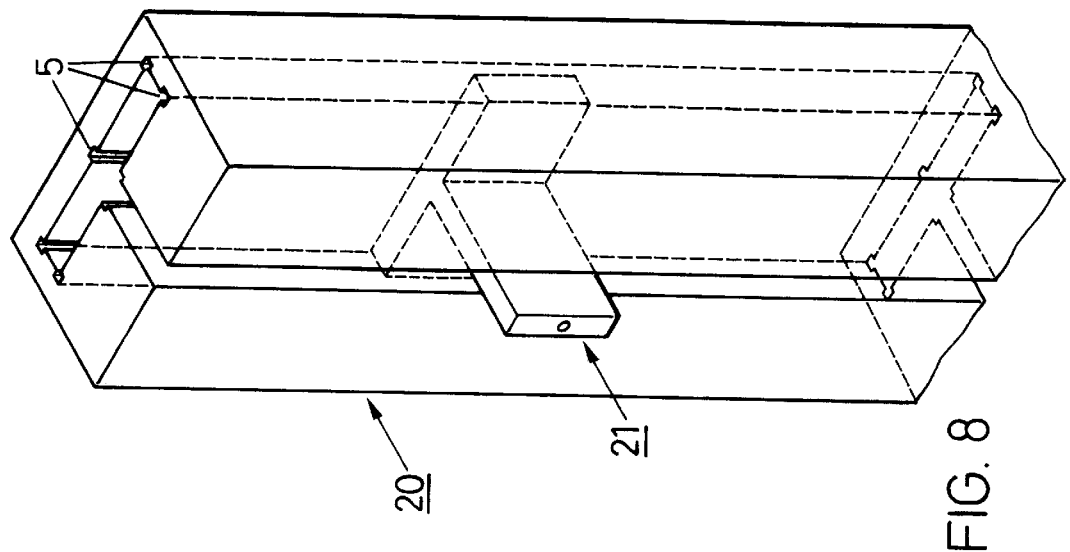
FIGS. 7 and 8 are an end elevation, in section, and a schematic perspective view, respectively, of an embodiment of a body moved in a linear guide, the body being mounted in the linear guide in accordance with the method of the invention.
Figure 7:
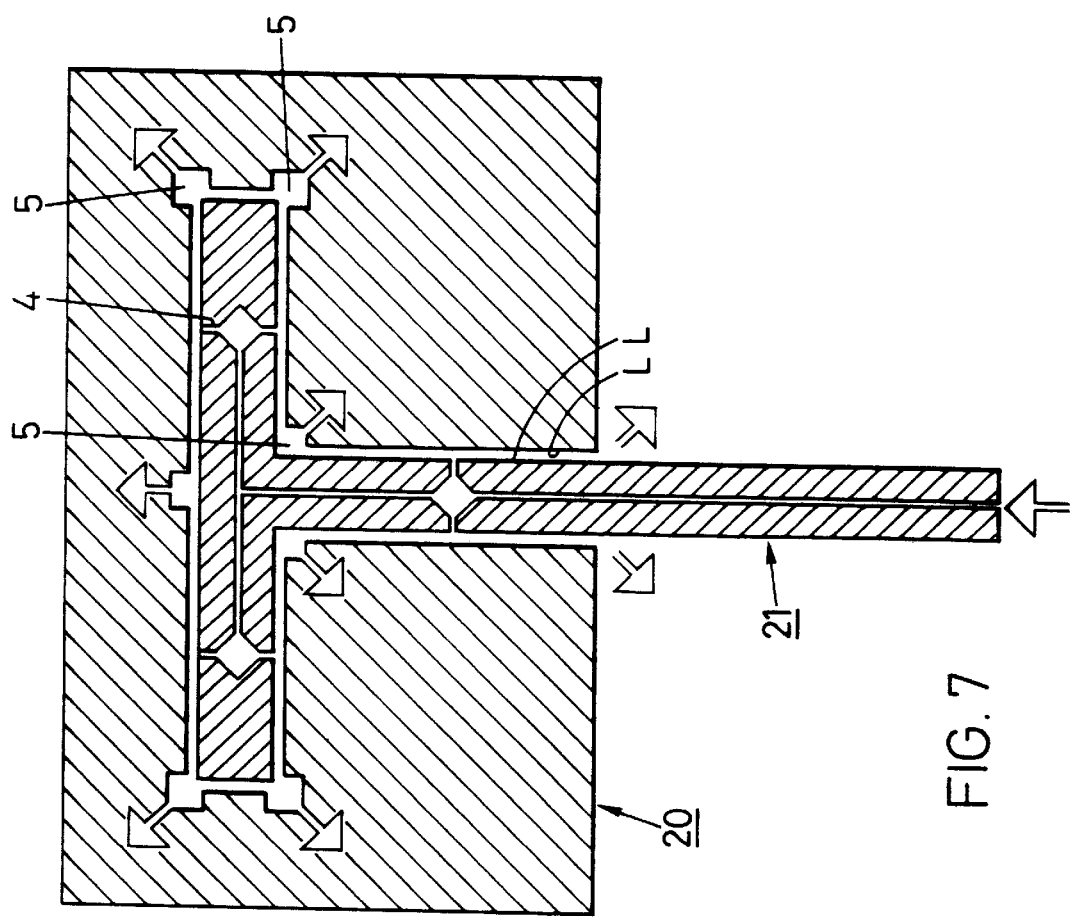

FIGS. 7 and 8 show a body 21 moved in a linear guide 20, the moving body in the linear guide being seated according to the method of the invention. FIG. 7 shows a cross-section through the system, once again showing bearing surfaces L, nozzles 4 and exhaust air ducts 5, which fulfil the aforementioned symmetry requirements. FIG. 8 is a three-dimensional representation of the system. Unlike the sliding bearing according to FIG. 1, nozzles 4 are arranged in the moving and not in the stationary body, which is appropriate in view of the much greater extension of the bearing surfaces of the stator (linear guide) compared with the bearing surfaces of the moving body.

FIG. 7 can also be looked upon as a system formed by rotor 21 and stator 20. As opposed to the bearing according to FIG. 1, the bearing body positioned at the end of the rotary shaft only has one radially extending, plate-shaped part, whereas the function of the axially extending, hollow cylindrical part is taken over by the shaft. In accordance with what has been stated hereinbefore, the rotor according to FIG. 10 can be radially less strongly loaded than the shaft of FIG. 1, because the radially acting bearing surfaces are smaller.

In the sliding bearing according to the invention between the bearing surfaces (L), sliding on one another, of a movable body (1, 3) and a stationary body (2), air flows are produced, in that compressed air is expanded to atmospheric pressure by nozzles (4) between the bearing surfaces (L). As a result of these air flows, the static pressure between the bearing surfaces (L) is reduced, so that compressive forces acting between the moving and the stationary body are produced. The bearing surfaces (L) and air flows are so matched to one another that the movable body (1, 3) is in a force-free equilibrium state, if it assumes a position in which the bearing surfaces (L) of the movable body (1, 3) are not in contact with the bearing surfaces (L) of the stationary body (2). In order that the equilibrium position is clearly defined, it is advantageous to choose the clearance between the movable body (1, 3) and stationary body (2) in such a way that any possible change to the spacings between the bearing surfaces brings about an oppositely acting change to the pressure rations. Spacings of approximately 0.01 to 0.02 mm are suitable for air flows. So that the sliding bearing can absorb external forces, for increasing the compressive forces, it is advantageous to enlarge the bearing surfaces. The sliding bearing is virtually free from friction and free from wear. It is suitable for the bearing of machine parts moved in rotary or linear manner, e.g. spindles in machine tools.

What is claimed is:

1. A method for establishing a sliding bearing between a movable body (1, 3, 21) movable in a rotary or linear manner relative to a stationary body (2, 20), one of said bodies having a recess receiving a portion of the other body to provide at least two pairs of face-to-face bearing surfaces (L) which bearing surfaces slide relative to each other by means of a lubricant fluid, comprising the steps of:

sliding said bodies relative to each other;

infecting lubricant fluid under pressure through and normal to one of said bearing surfaces defining a first of said pairs to produce fluid flow between a first of said pairs of bodies;

injecting fluid lubricant under pressure through and normal to one of said surfaces defining a second of said pairs to produce fluid flow between said second of said pairs of surfaces, the direction of said injection through the surfaces being in opposite directions;

providing vents for said fluid;

selecting the pressure of the injected fluid to reduce static pressure ($p_2$) between the bearing surfaces (L) sliding relative to each other so that compressive forces are created between the stationary body and the movable body (1, 3, 21), said fluid being unthrottled from said bearing surfaces to said vents; and matching fluid flows and bearing surfaces to each other so that all the comprehensive forces acting on the movable body are substantially mutually cancelled out when the movable body (1, 3, 21) is positioned in an equilibrium position not contacting the stationary body (2, 20) and so that restoring forces occur when the bodies are deflected from the equilibrium position.

2. A method according to claim 1 wherein clearance is provided between the stationary body (2, 20) and the movable body (1, 3, 21) and said clearance is chosen such that the spacings between bearing surfaces (L) of the stationary body and the bearing surfaces of the movable body are so small that any deflection of the movable body (1, 3, 21) from its equilibrium position modifies the pressure ratios between the bearing surfaces.

3. A method according to claim 2, wherein the fluid comprises air and the clearance between the movable body (1, 3, 21) and stationary body (2, 20) is chosen such that the average spacing (d) between bearing surfaces (L) sliding relative to one another is 0.005 to 0.05 mm, preferably 0.01 to 0.02 mm.

4. A method according to claim 3 wherein the bearing surfaces (L) of the movable body (1, 3, 21) are shaped such that substantially each bearing surface area (B) has a corresponding opposite area (B'), the normals (N and N') of the bearing surface area (B) and the corresponding opposite area (B') being collinear and have mutually opposing directions, and that the fluid flows over each bearing surface area in an unloaded equilibrium position are substantially identical to the fluid flows over the corresponding opposite area.

5. A method according to claim 3 wherein air is expanded through nozzles (4) from a pressure of at least 1.5 atm to atmospheric pressure for producing the fluid flows and each nozzle has an opening diameter of approximately 0.5 mm.

6. A method according to claim 5 including producing the fluid flows by forcing air through nozzles (4) arranged both on the bearing surface areas and on the opposite areas substantially perpendicular to and between the bearing surfaces (L) and venting the gaps between bearing surfaces sliding relative to one another by venting ducts (5).

7. A method according to claim 1 including, for a given operating pressure matching the size of the overflowed bearing surfaces to an external disturbance forces so that the disturbance forces represent a small percentage of the compressive forces (K2).

8. A sliding bearing comprising a movable body (1, 3, 21) movable in a rotary or linear manner relative to a stationary body (2, 20), one of said bodies having a recess receiving a portion of the other body to provide at least two pairs of face-to-face bearing surfaces (L) which bearing surfaces are adapted to slide relative to each other by means of a lubricant fluid, at least one nozzle in one of said bearing surfaces defining a first of said pairs, at least one nozzle in another one of said bearing surfaces defining a second of said pairs, said nozzles being oriented normal to their bearing surface and being directed in opposite directions, a vent adjacent each nozzle, said face-to-face bearing surfaces defining cross-sectional clearance areas which are instantaneously constant between said nozzle and through said vent under equilibrium and loaded conditions of said bearing.

9. A sliding bearing according to claim 8 wherein the clearance between the movable body (1, 3, 21) and stationary body (2, 20) is such that an average spacing between the bearing surfaces (L) sliding relative to one another is 0.005 to 0.1 mm.

10. A sliding bearing according to claim 9 wherein the bearing surfaces (L) of the movable body (1, 3, 21) are such that substantially each bearing surface area (B) has a corresponding opposite area (B'), and normals (N and N') of the bearing surface area (B) and the corresponding opposite area (B') are on the same line and have mutually opposing directions, and the means for producing the fluid flows are so constructed that the fluid flows over each bearing surface area (B) in the unloaded equilibrium state are substantially the same as the fluid flows over the opposite area (B').

11. A sliding bearing according to claim 8 wherein said nozzles (4) are placed on the bearing surfaces (L) with spacings of at least 80 mm.

12. A sliding bearing according to claim 8 wherein the movable body is a rotary shaft (1) and the bearing body (3) is a rotary body coaxially mounted thereon.

13. A sliding bearing according to claim 12 wherein the at least one bearing body (3) comprises a plate-shaped axial bearing mounted on the shaft and extending radially away from the shaft and comprises a hollow cylindrical radial bearing extending from said plate-shaped axial bearing.

14. A sliding bearing according to claim 13 wherein nozzles (4) are located in the bearing surfaces (L) of the stationary body (2).

15. A sliding bearing according to claim 8 wherein said stationary body (20) is a linear guide and that said movable body (21) is linearly movable in the linear guide.

16. A sliding bearing according to claim 15 wherein said nozzles (4) are placed in the bearing surfaces (L) of the movable bearing body (21).

17. A sliding bearing according to claim 8 wherein the clearance between the movable body (1, 3, 21) and the stationary body (2, 20) is such that the average spacing (d) between the bearing surfaces (L) sliding relative to one another is 0.01 to 0.02 mm.

* * * * *

UNITED STATES PATENT AND TRADEMARK OFFICE
CERTIFICATE OF CORRECTION

PATENT NO. : 6,149,306
DATED : November 21, 2000
INVENTOR(S) : Zosi

It is certified that error appears in the above-identified patent and that said Letters Patent is hereby corrected as shown below:

Column 7, Line 30, (Claim 1, Line 9), delete 'infecting' and insert --injecting--.

Signed and Sealed this

Twenty-ninth Day of May, 2001

Attest:

NICHOLAS P. GODICI

Attesting Officer  Acting Director of the United States Patent and Trademark Office